UNITED STATES PATENT OFFICE.

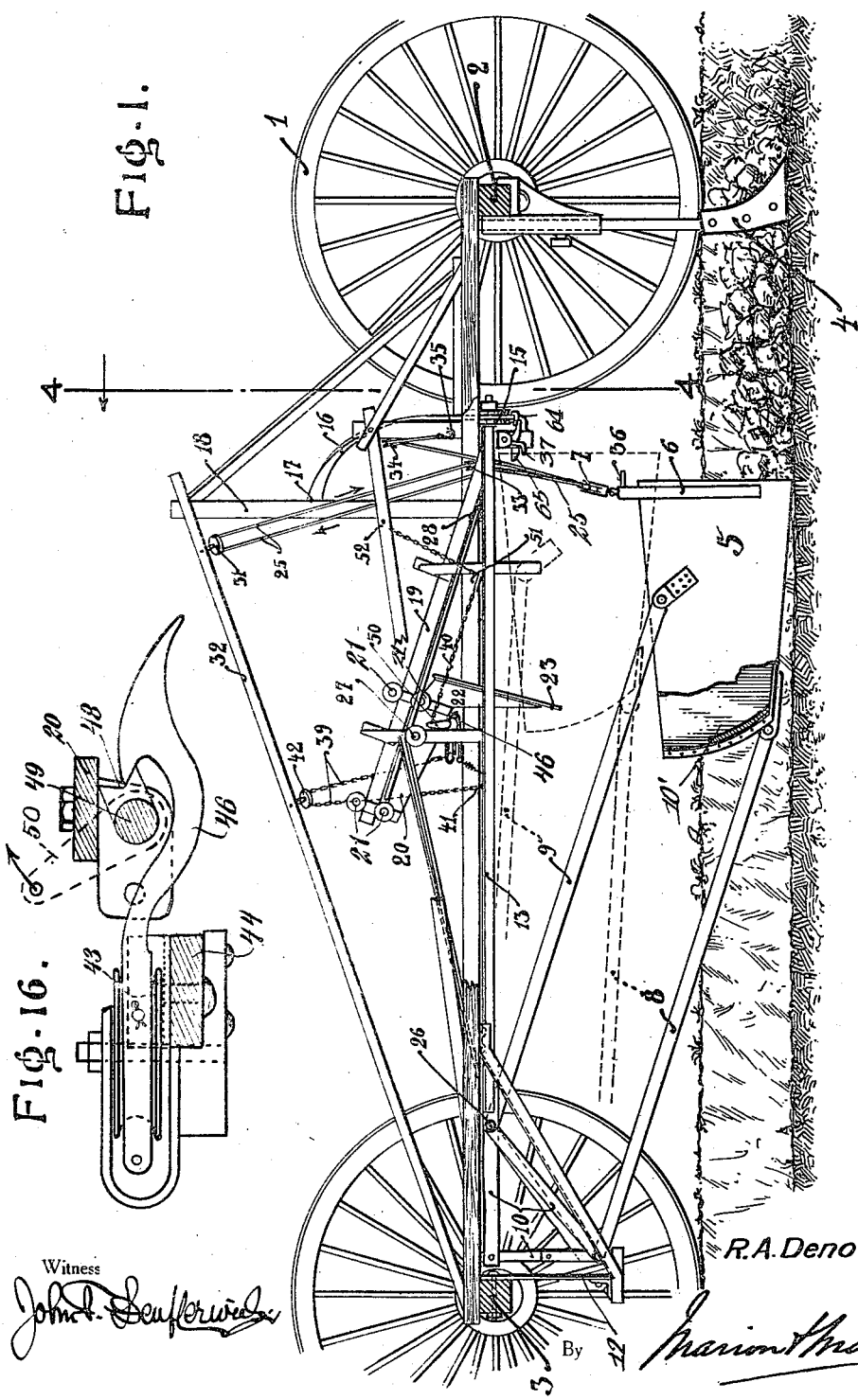

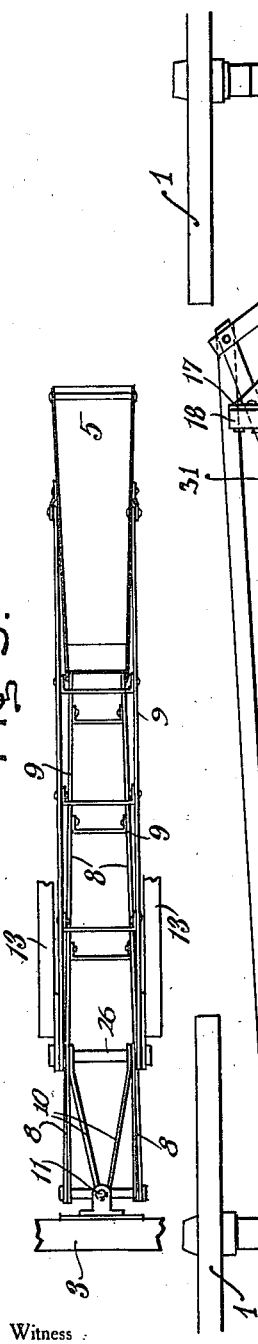

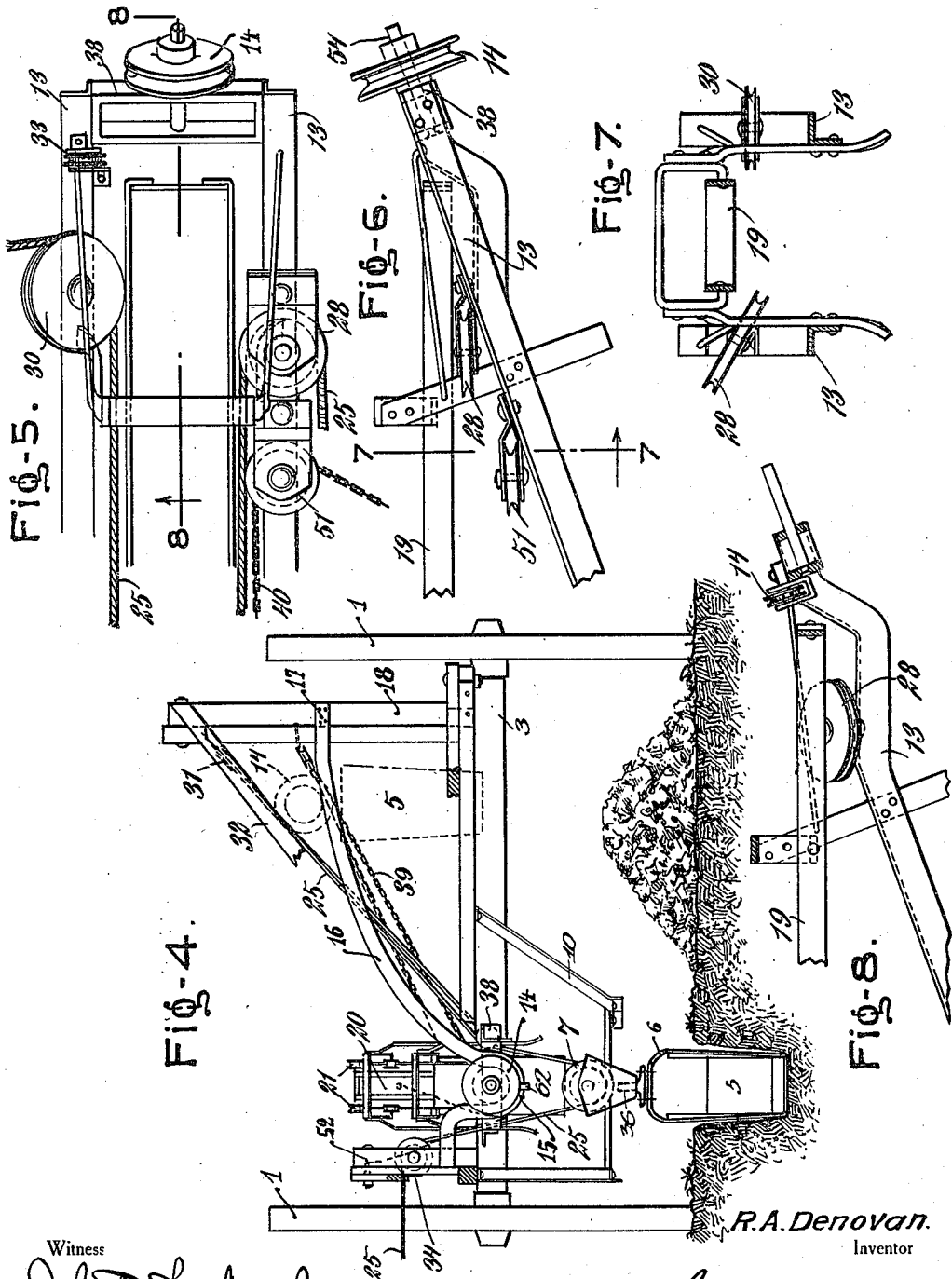

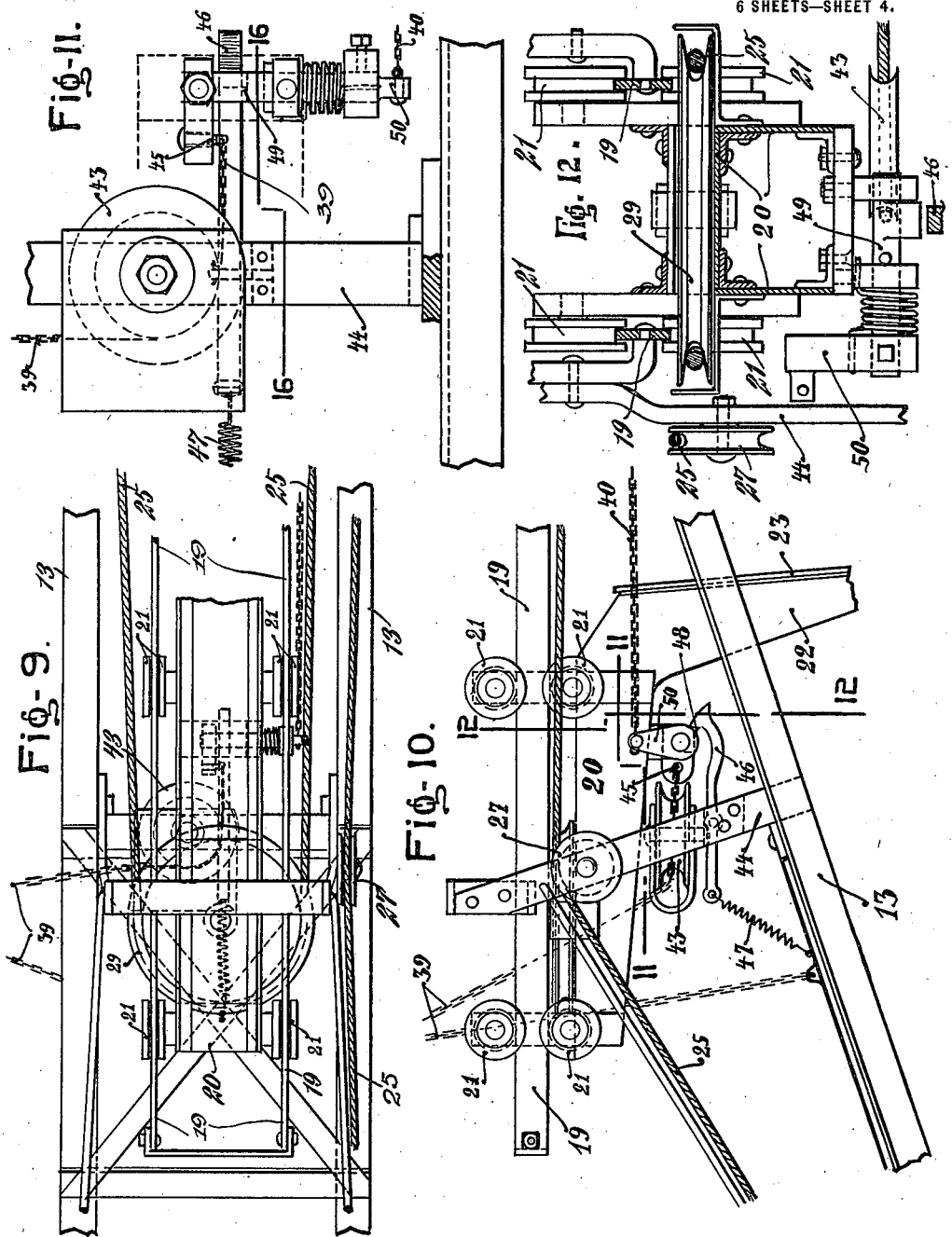

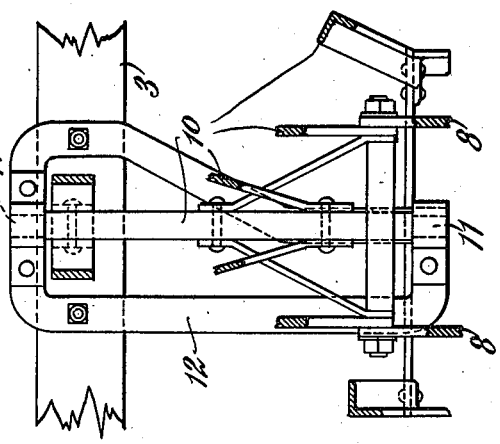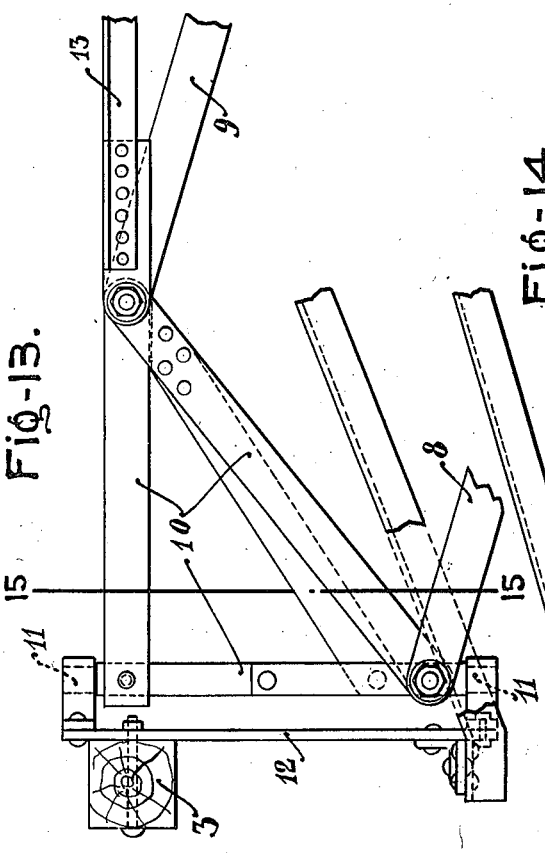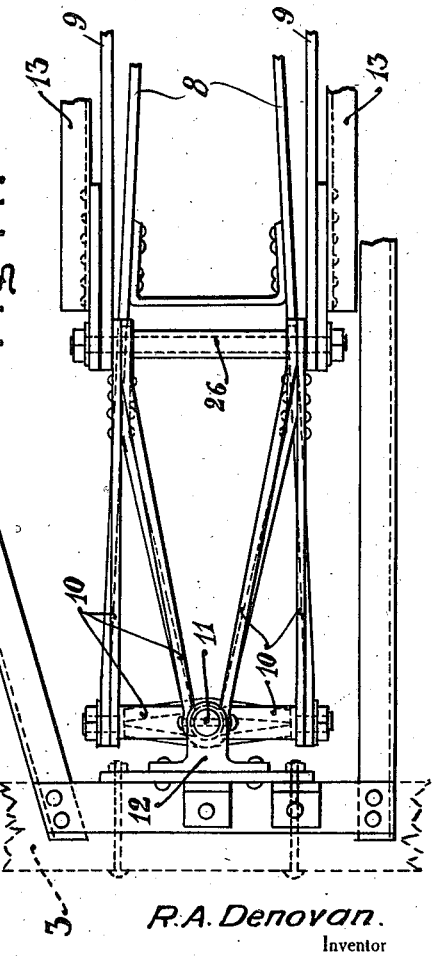

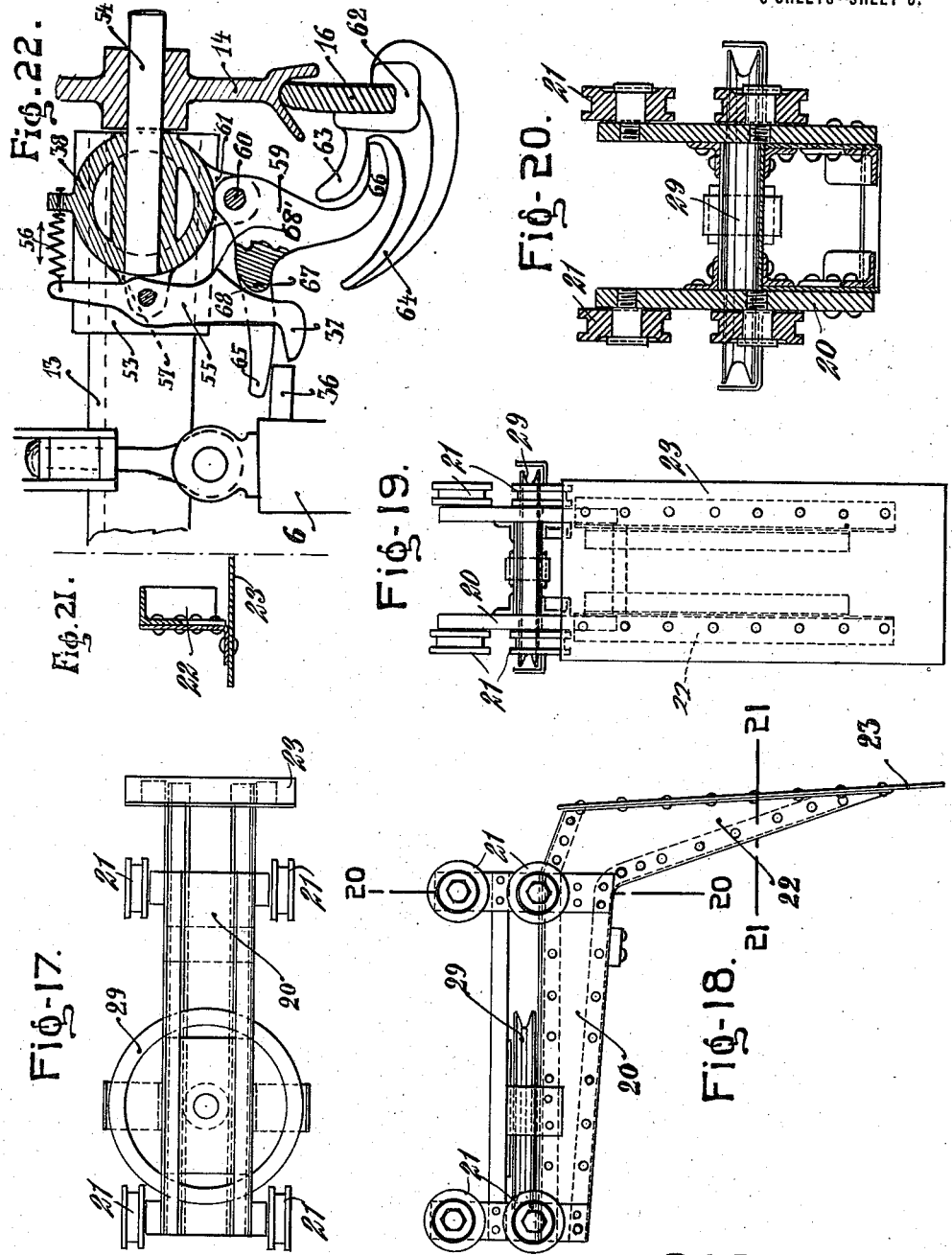

ROBERT A. DENOVAN, OF DALKEITH, ONTARIO, CANADA, ASSIGNOR OF ONE-HALF TO JOHN AIRD, OF TORONTO, ONTARIO, CANADA.

DITCHING-MACHINE.

1,200,173.  Specification of Letters Patent.  Patented Oct. 3, 1916.

Application filed May 14, 1915. Serial No. 28,066.

*To all whom it may concern:*

Be it known that I, ROBERT A. DENOVAN, a subject of the King of Great Britain, residing at Dalkeith, Province of Ontario, Canada, have invented certain new and useful Improvements in Ditching-Machines; and I do hereby declare that the following is a full, clear, and exact description of the invention, such as will enable others skilled in the art to which it appertains to make and use the same.

The present invention refers to ditching-machines, and more particularly it consists in a machine for ditching straight extending trenches for putting drain-pipes or other purposes, in a quicker, better and more economical way than it can be done by laborers. To this purpose my machine consists in the combination of a carriage or cart with suitable means for loosening or breaking the earth and means for collecting it into a large scoop, which, from time to time, is discharged at the side of the trench. In order to execute such functions, it is an important feature of my machine, that the scoop is fixed on a frame work, which may swing up and down as well as to the side, and, further, a track is provided on the carriage, on which the frame work carrying the scoop is guided.

Another important point is the arrangement of special earth ejecting means on the carriage, which, if the scoop is raised and swung to the side, push the earth out of same.

Further there are provided ropes and chains for producing and controlling the different movements mentioned above, and other important points of the invention and details in the construction will be mentioned in the course of the detailed description.

In order to more clearly disclose the construction, operation, and use of the invention, reference should be had to the accompanying drawings forming part of the present application. Throughout the several figures of the drawings like reference characters designate the same parts.

In the drawings: Figure 1 is a side-elevation of the machine; Fig. 2 is a top plan view of the same; Fig. 3 is the plan of the scoop-supporting frame; Fig. 4 is a front-elevation of the machine; Figs. 5 and 6 are plan and side-elevation of the front-end of the scoop supporting frame; Figs. 7 and 8 are sections on the line 7—7 of Fig. 6 and line 8—8 of Fig. 5; Figs. 9 and 10 are plan and side-elevation of the earth-ejecting device and the part of the scoop-supporting frame, holding same; Figs. 11 and 12 are sections on lines 11—11 and 12—12 of Fig. 10; Figs. 13 and 14 are side-elevation and plan of the triangular parts, jointing the rear-end of the scoop-supporting frame to the rear-axle of the carriage; Fig. 15 is a section according to line 15—15 in Fig. 13; Fig. 16 is the side-elevation of the lock arresting the earth-ejecting device at the rear end of the track carrying same; Figs. 17, 18 and 19 are plan, side-elevation and front-elevation of the earth-ejecting device; Figs. 20 and 21 are sections according to lines 20—20 and 21—21 of Fig. 18; and Fig. 22 is a side-elevation partly in section, of the lock connecting the scoop to the scoop supporting frame.

In the illustrated embodiment of my invention the ditching machine is mounted on four wheels 1, which as Figs. 1, 2, and 4 show, are on two axles 2, 3 at some distance from each other, the wheels running on both sides of the trench to be ditched. On the front axle 2 there is mounted suitable means for breaking the soil to pieces, so that it can be taken up by the scoop without difficulty; the drawing in Fig. 1 shows a simple construction of a plow or colter 4, the haft of which allows a vertical adjustment according to the depth of the trench to be ditched by the scoop.

The scoop 5 which collects and removes the earth from the trench, has approximately the form of a rectangular box which however in all dimensions is somewhat narrower in the rear part than in the front part; the flaring of the mouth diminishes the working resistance and provides a good digging clearance; the back-plate extends preferably up to 10′ from the ground and it is curved to avoid a hard striking of the lumps, which are collected in it; the sides are plane or slightly warped, and at the front-end they are further reinforced by the downwardly extending ends of a bow 6, which bears the pulley 7 belonging to the mechanism for lifting and discharging the scoop at the side. For holding the scoop and directing it during the ordinary digging-work, it is hinged on two pairs of parallel arms, 8, 9, the one pair of arms 8 being attached at the corner between the back-wall and the bottom of the scoop, the other pair of arms 9 being attached at the upper part of the side-walls. The other ends of the arms 8, 9 are hinged to two triangular frames 10, (Figs. 1, 3, 13, and 14), designed to swing around their common vertical pivot 11, which is mounted in a member 12 which is fastened rigidly to the rear axle 3 of the machine. In consequence of these different hinges the scoop can be swung at will up and down or to the side.

The lifting and lowering is done by pulling in or giving out of the rope or chain which runs over the beforementioned pulley 7; the lateral displacement of the frame and the arms supporting same is effected by the same rope or chain in combination with the controlling bars 13. These bars 13 extend from the frames 10 forward to a place behind the front wheels of the machine, where a cross-bar 38 bears a roller 14, which during the ordinary digging work rests in the dip 15 of a track 16 (Figs. 1, 2, and 4). This track 16 extends across the front part of the carriage rising from the side of the dip 15 to the other side where it is fastened at 17 on a vertical post 18 sufficiently high to allow the discharging of the scoop 5 over a heap of earth at the side of the trench (Fig. 4). Fig. 2 shows that the track 16 is bent at same time in a circle around the pivot 11 to allow a free rolling on it of the supporting roller 14, when the frame 10 and bars 13 are swung to the side for dumping purpose. The bars 13 carry further a track 19 rising from the front to the middle part of back of the carriage, on which track 19 (Figs. 1 and 10) travels the earth-ejecting device. This device is similar to a little traveler as used in cranes; its body 20 is guided on the track 19 by pairs of tread-wheels 21 and a downwardly directed projection 22 of the body bears a sort of shovel or plate 23 corresponding in its size to the cross-section of the scoop, and adapted to push the earth out of the front opening of the scoop; if the traveler descends on its track and during the rising and the lateral swinging of the scoop 5 the plate 23 enters into same and is pushed on to the open front-end of same. During the ordinary digging-process the earth-ejecting device is locked in the position shown in Fig. 1 by a lock 46, as it is shown in detail in Fig. 16 and will be described farther down.

The periodical lifting, outswinging and discharging of the scoop 5 is done by the operating rope 25. The one end of this rope is fixed at 26 (Fig. 2), where the scoop-supporting arms 9 and the controlling bars 13 are fixed at the triangular frame 10; then it rises to a guide 27 (Figs. 1 and 10) at the normal place of the earth-ejecting device; goes down along the track 19 and around the pulley 28 (Fig. 2) in the corner between the front-track 19 and the front-controlling bar 13; back along the front-track 19 to a horizontal pulley 29 (Fig. 9) on the earth-ejecting device; again along the back-track 19 to the front part of the machine and there around a pulley 30 (Fig. 2) in the corner between the back-track 19 and the back-controlling bar 13; thence the rope rises to the pulley 31 (Figs. 1 and 2), which is fastened on a stay 32 between the rear axle 3 and the vertical post 18 near to the top of same; from the pulley 31 going downward it passes over the guide 33 on the rear-controlling bar 13 to the pulley 7 (Fig. 4) at the scoop, around this pulley and then upward again over a guide 34 at the machine frame to a hook 35 at the end of the rope outside of the machine. If a sufficient piece of the trench is dug and the earth collected into the scoop, the carriage is arrested in order to discharge the scoop. To this effect a horse is hitched to the hook 35 which now draws the rope 25 out of the machine.

The rope running over the different pulleys as described operates as follows: First the part of the rope between the pulleys 33, 7, 34 is drawn out and the scoop is lifted out of the trench from the position shown in Fig. 1 in full lines to the position shown in dotted lines. When this position is obtained, then eyelet 36 on the bow 6 of the scoop will be caught automatically between the arm 65 and a hook 37 on the cross-bar 38 see Fig. 22 which connects the front-ends of the controlling bars 13, so that the scoop is locked firmly to the frame formed by those bars 13, 38 and the other parts fixed to them. The detailed construction of this lock and its working will be described farther down. By a further pulling on the outer end of the rope the part of the operating rope between the pulleys 30, 31 and 33 is effected and it works by first lifting the roller 14 at the front-end of the frame with the controlling bars 13 and 38 out of the dip of the track 16 (Fig. 4) and then rolling the roller and the frame with the raised scoop locked to it, along the track 16 from the position shown in Fig. 2 in full lines to the position shown in Figs. 2 and 4 in dotted lines, where the scoop is at the side of the trench and sufficiently high over the ground. Then the earth-ejecting device is actuated by the further pulling out of the part of the operating rope 25 running over the pulleys 28, 29, 30, which draws the traveler 20 forwardly along the track 19, so that the shovel or plate 23 enters into the scoop and pushes the earth out of the mouth-opening of same dumping it so as to form a heap, as shown in Fig. 4. When that is done, the rope is loosened and in consequence of the influence of gravity the scoop-bearing frame 13, 38 rolls down the track 16, the scoop 5 is lowered again into the trench and the earth-ejecting device returns into its first position shown in Fig. 1.

The up and down movements on the track 19 of the earth-ejecting device are controlled by two chains 39 and 40. Chain 39 is fastened with its one end at 41 at the frame of the carriage, passes over a pulley 42 on the stay 32 then over a pulley 43, which is fixed on the supports 44 of the track 19, to a fixed point 45 on the body 20 of the traveler. The fixing points of the pulleys and of the ends of the chain 39 and its length are chosen, so as to allow the advancing of the traveler on the track 19 when the frame 13, 38 with the track 19 rises on the track 16, while in the return movement of the frame 13, 38 the distance between the pulleys 42 and 43 increases (see Fig. 2), so that the traveler 20 is drawn back on the upper part of the track 19, where it is secured by the hook 46, fixed likewise on the supports 44 at the side of the pulley 43, which hook 46 under the influence of the spring 47 catches on the corner 48 of projection on the trunnion 49 fixed at the lower side of the traveler 20. The other chain 40 is fixed at an arm 50 of the same trunnion 49 and passes over a pulley 51 on the scoop-supporting bars 13 to a fixing point 52 on a stay belonging to a vertical frame on the left side (Fig. 4) of the machine. The length and fixing points 50, 52 of the chain 40 and the place of the pulley 51 are chosen, so as to keep the arm or trigger 50 at rest, in the position which is shown in Fig. 10, as long as the traveler is in its normal position on the track 19 and likewise when it moves together with the same during the first part of the travel from the left side of Fig. 4 to the right side. A short distance from the end of the sidewise travel of the traveler on the track 16 the length of the chain 40 is used up, and further movement unclenches the trigger 50, and the connection between the hook 46 and the projection 48, so that now the traveler 20 or the earth-ejecting device can roll down and forwardly on the track 19 so as to push the earth out of the scoop, whereby the kinetic energy of the moving parts will help the action of the operating rope 25.

After discharging of the scoop, the supporting frame, the scoop and the traveler return to their original position, as described above. The depth of the trench to be dug is fixed at the beginning by the quantity of rope 25 which is given out at the one end, at 36 (Fig. 2), and by a stop 35' arranged at the other end, near to the hook 35, which stop prevents the rope 25 from slipping back through the pulleys; the remaining part of the rope determines the depth to which the scoop hangs down and consequently the depth of the trench which is dug.

The front-end of the scoop-supporting frame and the lock for fixing the scoop to it, when it is raised out of the trench and is traveling along the track 16, is shown in Fig. 22. According to that construction the front-ends of the two supporting arms 13 are fixed into the square projections 53 at the ends of a malleable casting 38 of circular cross section. In the center of this casting 38 a pin 54 is placed which bears the roller 14, by which the supporting frame 13, 38 rolls on the track 16. The lock for attaching the scoop to the supporting frame comprises the two-armed lever 55 with the hook 37, pivoted on the lug 57 of the cross-bar 38; the bell-crank-shaped lever 59, hinged by the pin 60 at the lug 61 of the cross-bar 38; and the part 62 with the two hooks 63, 64 fixed on the track 16. When the scoop 5 is raised, the lug 36 on the bail 6 of the scoop strikes against the point 65 of the lever 59 and swings the latter around its pin 60. The other arm 66 of the lever 59 leaves the corner between the two hooks 63, 64; the base-part 67 between the two prongs 65 strikes against the curved back 68 of the lever 55, so that its hook 37 catches below the lug 36.

When the scoop 5 is in position as shown in Fig. 1 and it is desired to raise and dump the contents scooped up thereby a draft animal is connected to the cable 25 whereby upon pulling upon the same the scoop will be caused to rise above the ground. The swinging frame is held against movement as it is locked to the rail 16. This locking connection is accomplished by the lever 59 wherein its hooked portion 66 engages under the prong 63 and is held in locking engagement with the prong 63 due to the fact that the lever 55 is pressing against the opposite arm of the lever 59. To cause the swinging frame to be released the lug 36 carried by the scoop will during its rising movement strike the arm 65 whereby the projection 67 of the lever 59 will exert a force against the cam face 68 of the lever 55 overcoming the tension of the coiled spring 56 whereby the hook 66 will be forced out of engagement with the prong 63. As the lug 36 is raised higher the lever 59 will be swung upon its pivot connection 60 until the projection 67 rides past the projection 68' of the lever 55. When the projection 67 has passed the cam 68' the tension of the coiled spring 56 will be released whereby the cam 68 will rest under the projection 67 for holding the arm 65 of the lever 59 in its raised position. When the lever 59 is in this position the hook 37 of the lever 55 will extend in the path of travel of the lug 36 and the lug 36 will then be held in locking engagement between the arms 65 and the lug 36. When further force is exerted upon the cable 25 by means of the draft animal the swinging frame having been released will travel up upon the track 16 to the dotted position as shown in Fig. 2 of the drawings and subsequently the earth ejecting device will be brought into operation wherein it will eject the soil contained within the scoop. After the dumping operation has been completed the draft animal which is connected to the hook 35 of the cable 26 releases the cable whereby the earth ejecting device will return to its normal position upon the track 19 by gravity, as this earth ejecting device is free to travel upon its track and will be the first to take up any slack within the cable 25 and is subsequently locked in place by means of the latch 46 as formerly described. Upon further slack being permitted to the cable 25 the swinging frame will start to travel down the inclined track 16 until the roller 14 rests within the groove 15. When the swinging frame has returned to its normal position the hook 66 of the lever 59 will strike against the upper curved face of the prong 64 thereby causing the lever 59 to turn upon its pivot and during this operation the projection 67 will ride upon the projection 68' and after passing the projection 68' it will release the lever 55 and the lever 55 will be caused to return to its normal position as shown in Fig. 22. As the swinging frame is in its normal position the lug 36 of the scoop will be free to pass the hook 37 thereby permitting the scoop to return to its scooping position.

In the accompanying drawings is shown the simple and preferred form of the invention it being, however, understood that no limitation is necessarily made to the precise structural details herein exhibited but the right is hereby reserved to any changes or alterations that may be had and come within the scope of the invention without departing from the spirit thereof or sacrificing the efficiency of the same.

Having thus fully described my invention, what I claim as new and desire to secure by Letters Patent is:

1. A ditching machine comprising in combination, a wheel mounted vehicle, a scoop for ditching and scooping earth, a frame turnable on a vertical axis near the rear axle of the vehicle, vertically swinging arms carried by the frame, the scoop being carried by said arms, a roller on the front end of the frame, a track carried by the vehicle for guiding the roller in a curved path from the lowest point corresponding to the ditching position to the highest point corresponding to the discharging position, an inclined track on the scoop supporting frame, an earth ejecting device adapted to travel upon said inclined track to enter the scoop for ejecting the earth from the same, pulleys on the scoop supporting frame, the earth ejecting device, the scoop and the vehicle frame, and an operating rope fixed to the rear part of the vehicle frame and passing over said pulleys for the purpose set forth.

2. A ditching machine comprising in combination a supporting frame, a movable frame mounted thereon, a scoop supported by said movable frame, means for raising said scoop, means for locking said scoop to the movable frame, said means for raising the scoop adapted to move said frame after the scoop has been raised and the movable frame and scoop adapted to return to their normal positions when said raising means has been released.

3. A ditching machine comprising in combination a portable frame, a swinging frame pivotally mounted thereon, a scoop carried by said pivoted frame, an inclined track carried by said swinging frame, an earth ejecting device adapted to travel upon said inclined track, means for raising and lowering said scoop and causing the movable frame to move, and means whereby after the raising of said scoop the earth ejecting device will be brought into operation whereby the same will force the earth from the scoop.

4. A ditching machine comprising in combination a supporting frame, a curved inclined track rigidly mounted upon said frame, a swinging frame pivotally mounted to the supporting frame, a roller carried by said swinging frame and adapted to travel upon said inclined track, means for locking said swinging frame to the inclined track when the swinging frame is in its normal position, a scoop adapted to be raised and lowered beneath said swinging frame and means whereby when said scoop is raised the locking means will be released permitting the swinging frame to travel upon said curved inclined track.

5. A ditching machine comprising in combination a supporting frame, a pivoted frame mounted thereupon, vertically swinging arms carried by said pivoted frame, a scoop carried by said arms, means for locking said scoop to the pivoted frame, means for locking said pivoted frame to the supporting frame and means for raising and lowering said scoop.

6. In a ditching machine the combination of a supporting frame, a frame pivotally mounted thereupon, a curved inclined track carried by the supporting frame, vertically swinging arms carried by the pivoted frame, a scoop carried by said vertically swinging arms, an inclined track arranged upon the pivoted frame, a traveler adapted to move upon said track, an earth ejecting device carried by said traveler, and a single cable for causing the scoop to be raised, the swinging frame to be moved and the earth ejecting device to be brought into operation.

7. In a ditching machine the combination of a supporting frame, a pivoted frame mounted thereon, a scoop adapted to be raised and lowered beneath said pivoted frame, an earth ejecting device carried by said pivoted frame for ejecting the earth from said scoop, a single cable adapted to cause said scoop to be raised said pivoted frame to be swung upon its pivoted connection and the earth ejecting device to be brought into operation, the said scoop pivoted frame and earth ejecting device being adapted to return to their normal positions by gravity.

8. In a ditching machine the combination of a supporting frame, a curved track rigidly secured adjacent one end of said supporting frame, a swinging frame pivotally connected adjacent the opposite end of the supporting frame, a roller carried by said swinging frame and adapted to travel upon said inclined track, vertically swinging arms pivotally connected to the swinging frame, a scoop carried by said arms, means for locking said swinging frame to said track, means for locking said scoop to said swinging frame, an inclined track mounted upon said swinging frame, an earth ejecting device adapted to travel upon said inclined track, a latch for holding said earth ejecting device upon the raised end of said inclined track, means for causing said swinging frame to travel upon the curved inclined track, means for releasing said latch whereby the scoop ejecting device may be brought into operation, means for raising said scoop and means whereby when said scoop is raised the swinging frame will be released from locking engagement with said curved inclined track.

In witness whereof I have hereunto set my hand in the presence of two witnesses.

ROBERT A. DENOVAN.

Witnesses:
MARGARET MACLEOD,
R. LOBROSSE.